United States Patent [19]

Snow, Jr.

[11] Patent Number: 4,989,926

[45] Date of Patent: Feb. 5, 1991

[54] CASE-STAND FOR HAND HELD CALCULATORS, COMPUTERS AND DATA COLLECTORS

[76] Inventor: Allison D. Snow, Jr., 5808 Westport Cir., Las Vegas, Nev. 89108

[21] Appl. No.: 439,490

[22] Filed: Nov. 21, 1989

[51] Int. Cl.$^5$ .................................................. A47B 21/00
[52] U.S. Cl. ................................. 312/208; 312/317.1; 312/325
[58] Field of Search ..................... 312/325, 282, 208; 248/150; 206/305; 235/10

[56] References Cited

U.S. PATENT DOCUMENTS

| | | | |
|---|---|---|---|
| 4,053,047 | 10/1977 | Andreaggi | 206/45.2 |
| 4,113,212 | 9/1978 | Coriden | 248/676 |
| 4,165,554 | 8/1979 | Faget | 235/10 |
| 4,259,568 | 3/1981 | Dynesen | 206/45.2 X |
| 4,424,899 | 1/1984 | Rosenberg | 206/45.2 X |

OTHER PUBLICATIONS

Educalc ?/1988 #40 Magazine, p. 48.
Educalc ?/1989 #46 Magazine, pp. 14 and 15.

*Primary Examiner*—Joseph Falk

[57] ABSTRACT

The case-stand performs two functions; as a protective case in the fully closed position, and as a desk stand in the fully open position for hand-held calculators, computers, and data collectors; comprises a case bottom (1) which holds the instrument (17) securely by the insert holding feature (11) and a case top (2) which has a latch (7) feature that allows the case bottom (1) and case top (2) to securely latch together in the fully closed position. The case bottom (1) and case top (2) are hinged together with hinge (3) with two pins (4) which are pressed through case bottom (1) hole (13) into hinge (3) hole (15) in each of case to the proper depth and with two pins (4) which are pressed through case top (2) hole (14) into hinge (3) hole (15) in each side of case to the proper depth. Hinge (3) is located at the top edge of the case and instrument (17) allowing the case top (2) to swing approximately 360 degrees underneath the case bottom (1) interlocking together using the insert locking feature (8) of case top (2) and the cavity locking feature (9) of case bottom (1) to lock these two parts together in the fully open stand position so they cannot move passed each other when the user is keying the instrument (17). Case top (2) has an insert holding feature (10) which helps hold the case top (2) to the instrument (17) in the fully closed position. The bottom case (1) has a latch recess (12) to allow the user to place his finger or thumb under the case top (2) latch (7) feature to push upward to unlatch the case top (2) from the case bottom (1) whereby opening the case for use by placing the case in a desk stand position. The case top (2) has a non-skid foot (16) feature that is made of soft rubber, which serves to hold the desk stand to any smooth desk surface while the user is keying the instrument (17). The case top (2) has a nameplate (5) attached with epoxy (6) in the recess area for the nameplate. The case-stand will vary in size to fit each size hand-held calculator or hand-held computer, or hand-held data collector. These items are referred to as an instrument in my patent application.

8 Claims, 5 Drawing Sheets

CASE-STAND FOR HAND HELD CALCULATORS, COMPUTERS AND DATA COLLECTORS

BACKGROUND—FIELD OF INVENTION

This invention relates to cases and desk stands, especially to hand held calculators, computers and data collectors, providing the user a choice of using the case-stand as a protective carrying case when in the fully closed position and as a desk stand when in the fully open position.

BACKGROUND—DESCRIPTION OF PRIOR ART

Many, if not most users of hand held calculators, computers and data collectors prefer to carry their instrument in a protective carrying case when transporting it from one place to another and when the user is using their instrument prefer to place it on a desk stand so as to avoid keying errors by placing their instrument at the proper viewing angle, making it easier to view the instrument's readout display.

Heretofore, a wide variety of cases and desk stands have been proposed and implemented for carrying and holding hand held calculators, computers and data collectors.

One such case is made of hard leather used for carrying the instrument. This case cannot be used as a desk stand; therefore, making it necessary to completely remove the instrument from the carrying case before the instrument can be used by the user. When the carrying case is not being used, it has to be stored making it an inconvenience in keeping track of the case because it is a separate item from the instrument.

Another type case is made of soft leather like a wallet. It is called a side folding wallet case with a window pocket for cards and quick reference notes. The plastic retainer holds the instrument securely. This type wallet case opens to become a desk stand when using the instrument and holds it at an angle for the hand and eye. However, this case takes up too much room on the desk because of the wallet type mode. It lays out flat like a wallet and is hinged lengthwise of the case, which is the left side of the instrument. This case does not provide protection for the instrument from hard bumps the instrument can receive because the case is made of soft leather. Because of the wallet style, there are three edges unprotected making the top edge, the right edge and the bottom edge of the instrument susceptible to damage, if the case is dropped on these edges. The wallet case can come open when dropped and land on the key side of the instrument causing damage to the keys and readout display.

Another type case is made of hard plastic like a wallet. Both sides of the wallet house the instrument keys with a hinge along the length of the case in the middle of the case giving it the wallet feature. This type case can protect the instrument from damage when in the closed position but cannot be used as a desk stand because it folds out like a wallet into a flat position. It takes up too much room on the desk because of the wallet style. This case cannot hold the instrument at a proper viewing angle for the hand and eye.

Another type case is made of soft plastic which slips over the instrument to be carried, but it does not afford any protection to the instrument and is not able to be used as a desk stand. The only attribute is that it covers the instrument, except for the top edge of the instrument. The user needs to store the plastic cover case when not being used.

Another type case is made of soft leather or soft vinyl material which folds over the top edge of the instrument. It's made like a pocket with a flip over top to secure the instrument inside the case. This type is only a case and cannot be used as a desk stand. Because of the material being of soft leather, it does not afford the instrument inside the case any damage protection from a hard bump on the key side of the instrument.

One such desk stand is made of acrylic plastic which holds the instrument at an angle to avoid keying errors but cannot be used as a case. It can only be used as a desk stand. This desk stand needs to be stored when not in use.

The inconvenience of trying to find it when the user is ready to use it again is very provoking to the user.

Another type desk stand made of clear plastic, folds solidly and mounts with high bond tape pads onto the back of the instrument so the battery is accessible and data on the back of the instrument is visible. This type desk stand folds on the instrument to fit into original case, if any. This desk stand is only a stand and cannot be used as a protective carrying case. If an original case is supplied with the instrument, it is usually made of soft plastic or soft leather which does not afford any damage protection for the instrument. In time, the high bond tape pads come loose causing the stand to come apart from the instrument making it very inconvenient for the user. Many times the user decides not to reattach the stand to the instrument causing this type stand to be used only as a detachable stand.

Another type desk stand is made of stainless steel and attaches with super adhesive to the back of the instrument. This type desk stand offers two viewing angles. It fits into the original case, if any. This desk stand is only a stand and cannot be used as a protective carrying case. If an original case is supplied with the instrument, it is usually made of soft plastic or soft leather affording no damage protection for the instrument. Most users do not like to attach anything permanent to their instrument. Another problem with this type desk stand is that the adhesive can come loose causing the user inconvenience in trying to glue the stand to the instrument and in many situations the user will decide to leave the stand and instrument unattached using the stand as a separate desk stand.

Another type desk stand is made of clear acrylic plastic which is strong and thick. It's only a desk stand and cannot be used as a protective carrying case. The problem of storage when not in use is an annoyance to user when it's time to use the desk stand and it cannot be found. The problem is where was it stored when not in use.

Another type desk stand is made of wood in the shape of a wedge. It is dense and heavy. It can weigh over one-half pound. This type desk stand cannot be used as a protective carrying case but only as a separate desk stand. When not in use, this desk stand has to be stored. It can cause wasted time trying to find the desk stand when needed.

Another type desk stand is made of clear plastic with wire legs that holds the instrument at an angle and folds up so it fits in its original case. It attaches by high bond tape pads which secures it to the instrument; battery remains accessible and data on the back is visible. However, this is only a stand and cannot be used as a protective case.

Most users, therefore, would find it desirable to have a combination case-stand which is used as one item; a protective carrying case in the carrying mode and a desk stand, holding the instrument at the proper viewing angle for the hand and eye, avoiding keying errors when in the use mode on top of the desk or table. The footprint size stays the same in the fully closed position, as well as in the fully open stand position. That is the area taken up by the case in the fully closed position or in the fully open stand position.

OBJECTS AND ADVANTAGES

Accordingly, I claim the following as my objects and advantages of the invention: to provide a case-stand which is two items in one; in the fully closed position it is a protective carrying case affording the instrument complete damage protection; in the fully open stand position, it is a desk stand, holding the instrument at a proper viewing angle for the hand and eye of the user. The case has a locking latch feature that will hold the case top and case bottom securely together while being carried in the user's hand, briefcase, or in a pouch on the user's belt or when in storage on the shelf, desk or table. This case-stand is stored as one item, not as a separate case and as a separate desk stand. The case stand is made of a hard, durable material, plastic and, or die cast metal, giving the carrying case a damage proof feature to be able to protect the instrument from being damaged if dropped at any time while being carried. The case-stand has a holding feature on the inside of both sides that will hold the instrument securely when the case-stand is in the open position. The instrument cannot fall out of the case-stand because of this feature. The hinge feature is novel in itself because it allows the protective carrying case to be folded into the fully closed position giving it a case mode and allows the case to be folded into a desk stand in the fully open position. The hinge is located at the top edge of the case-stand and instrument. No prior art has done this. The prior art is hinged so as to allow the case to fold out into a flat position like a wallet type, hinged along the side of the case and instrument. The case-stand hinge is designed to last the lifetime of the case-stand and the instrument.

In addition, I claim the following objects and advantages: to provide a case-stand so the user needs only to buy one item not two separate items. There is no problem of storage of separate items, no inconvenience of remembering where the separate items were stored when needed by the user.

The case-stand invention is dramatic. It will provide the user's desk with a very professional look and it is sensible because it will avoid keying errors by placing the instrument at the proper viewing angle for the hand and eye, providing the desk stand position with non skid feet for keeping the stand from moving on a smooth surface. The proper viewing angle also provides the eye with less fatigue by giving the eye a better view of the instruments readout display. The stand position has a locking feature so the case stand does not move when being used in the fully open position. The case top swings under the case bottom to become the stand for the instrument, keeping the footprint the same size. The case top and case bottom have an interlocking feature which allows them to lock together, keeping them from moving passed each other when the instrument is being used in the desk stand position. The case-stand is light weight and compact—takes up less room on the desk than the wallet type case and stands. Because of this feature, it can be used inside the shop, drafting room, factory, lab or mill with ease as well as being used by the user in the outdoors, surveying, construction or line work use with ease, because of the compactness of being a case and desk stand all in one.

Readers will find further objects and advantages of the invention from a consideration of the ensuing description and accompanying drawings.

DRAWING FIGURES

Figure 4:
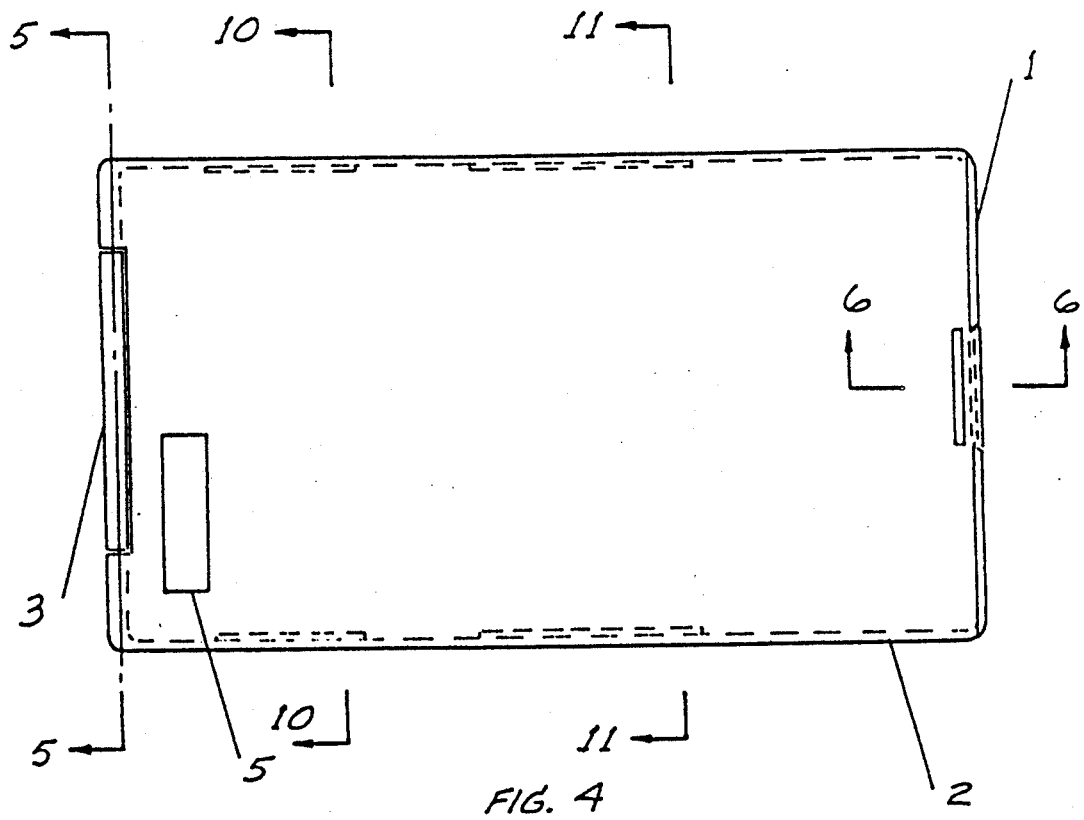
FIG. 4 shows the case-stand in a top view. The case in the fully closed position.
Figure 11:
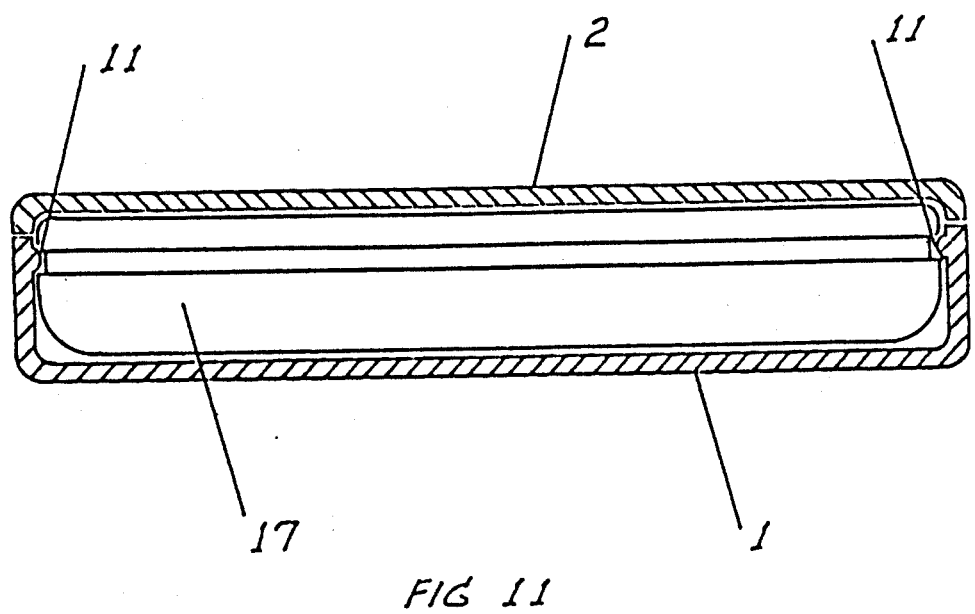

FIG. 11 a sectional view of the insert holding feature of case bottom taken along the line 11—11 FIG. 4. (Rotated 90° clockwise).

DRAWING REFERENCE NUMERALS 1 case bottom
2 case top
3 hinge
4 pin
5 nameplate
6 epoxy
7 latch of 2
8 insert locking feature of 2
9 cavity locking feature of 1
10 insert holding feature of 2
11 insert holding feature of 1
12 latch recess of 1
13 hole of 1
14 hole of 2
15 hole of 3
16 soft rubber non-skid foot
17 instrument

DESCRIPTION OF INVENTION

Figure 1:
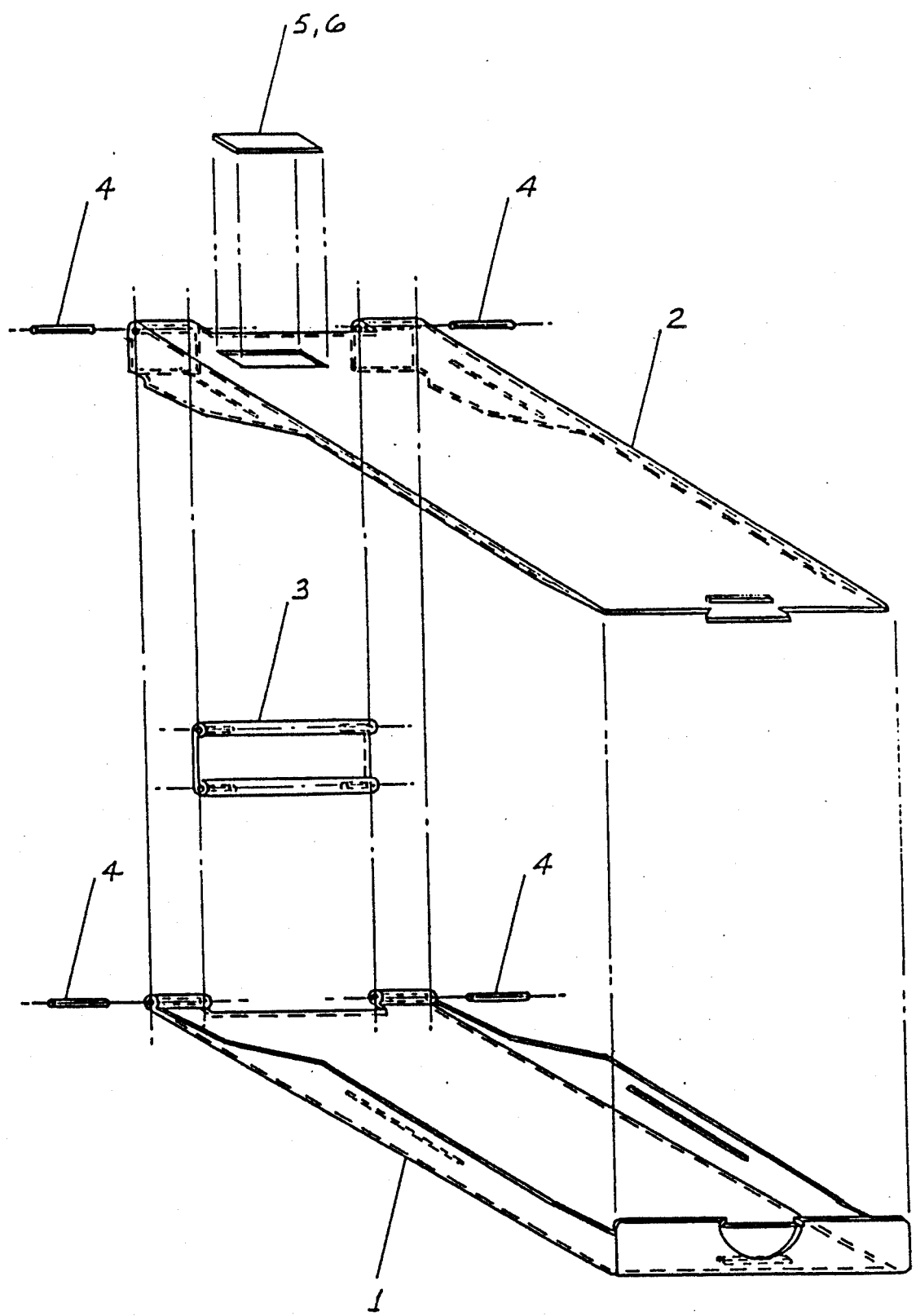
FIG. 1 shows the case-stand in an exploded view in perspective with all sub parts.

FIG. 1 an exploded view in perspective shows the case-stand with all preferred embodiment of the invention. The case-stand comprises of five parts: a case bottom 1, a case top 2, a hinge 3, a pin 4 (four required) and a nameplate 5, with epoxy 6, used to attach nameplate 5, to case top 2. The case bottom 1, case top 2, and hinge 3, will be made of hard, durable material, such as injection molded plastic and/or die cast metal. The pin 4 (four required), will be made of stainless steel or steel or of a very hard fiber filled plastic. The nameplate 5, will be made of plastic with epoxy 6, to attach to case top 2, or of metal laminated with plastic with an adhesive backing to attach the nameplate 5, to the case top 2. The case-stand will vary in size to fit each size hand-held calculator, or hand-held computer or hand-held data collector. These three items are referred to as an instrument in my patent application.

Figure 5:
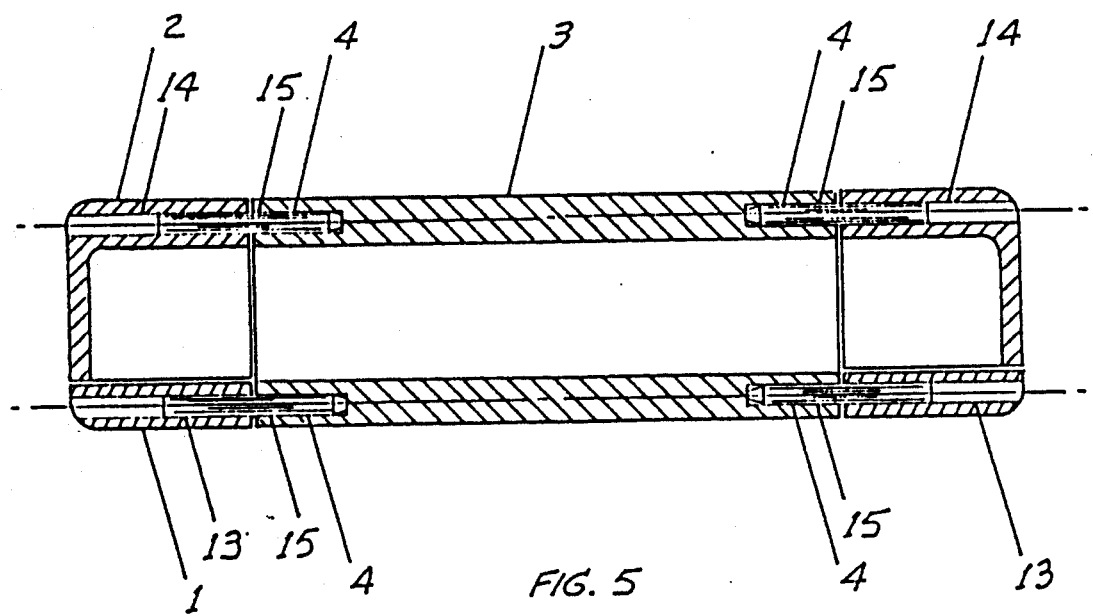
FIG. 5 shows a sectional view of such case-stand taken along the line 5—5 of FIG. 4. (Rotated 90° clockwise).

The three main parts are the case bottom 1, case top 2, and hinge 3, which are assembled by placing hinge 3, hole 15, in line with case bottom 1, hole 13, then press pin 4, through case bottom 1, hole 13, into hinge 3, hole 15, to the proper depth. One pin 4, is required on each side of case bottom 1, FIG. 5. Then place hinge 3, hole 15, in line with case top 2, hole 14, then press pin 4, through case top 2, hole 14, into hinge 3, hole 15, to the proper depth, one pin 4 is required on each side of case top 2. Hole 15 in hinge 3, has a depth of 0.3125 inches (7.9375 MM). Pin 4 is 0.040 inch (1.016 MM) diameter and is 0.625 inch (15.875 MM) long; therefore, allowing 0.3125 inch (7.9375 MM) of the pin to engage into the hinge and 0.3125 inch (7.9375 MM) engage in the case bottom 1, and case top 2, at both sides of the case. The pin holes will be filled with epoxy 6, even with the sides of the case preventing the pin 4, from coming out of the pin hole FIG. 5. The case top 2, has a latch 7, feature and the case bottom 1, has a latch recess feature 12, which allows the case bottom 1, and case top 2, to latch securely together and unlatch with ease, FIG. 6.

The case bottom 1, has an insert holding feature 11, which allows the case bottom 1, to hold the instrument 17, securely, FIG. 11.

Figure 9:
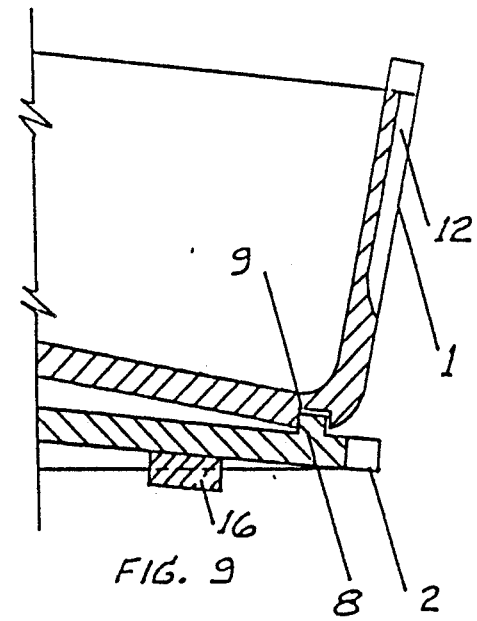
FIG. 9 shows a sectional view of the interlocking feature of the case top and case bottom of such case stand in the fully open stand position.

The case top 2, has an insert holding feature 10, which helps hold the case top 2, securely to the instrument 17, in the fully closed position of the case. Hinge 3, is located at the top edge of the case and instrument 17 allowing the case top 2, to swing approximately 360 degrees underneath the case bottom 1, interlocking together using the insert locking feature 8, of case top 2, and the cavity locking feature 9, of case bottom 1, to lock together in the fully open stand position In this fully open stand position, the case top 2, becomes the stand for the instrument 17. It has a non-skid foot 16, feature made of soft rubber which serves to hold the desk stand to any smooth desk surface while the user is keying the instrument 17, FIG. 9.

OPERATION OF INVENTION

Figure 2:
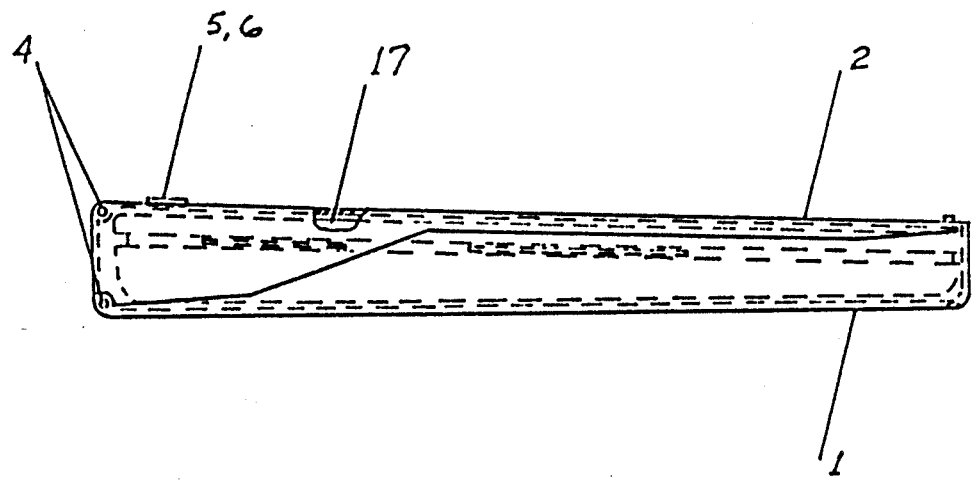
FIG. 2 shows the case-stand in a side view in the closed position. With the instrument inside the closed case.

The case-stand of FIG. 1 will perform as a hard, durable protective carrying case in the fully closed position FIG. 2, affording the instrument 17, damage protection. When in the fully open stand position FIG. 3, it is used as a desk stand for holding the instrument 17, at a proper viewing angle when operating the keys of the instrument 17, but the user shall find it most useful as a combination case and desk stand, which is the same footprint size as a case or as a desk stand. The case-stand is hinged by hinge 3 and pin 4, (four required), two pins 4, are used to hinge the case bottom 1, to hinge 3 and two pins 4, are used to hinge the case top 2, to hinge 3, at the top edge of the case-stand, also the top edge of the instrument 17. The pins 4, in the hinge 3 allows the case bottom 1, and case top 2 to swing approximately 360 degrees.

Figure 3:
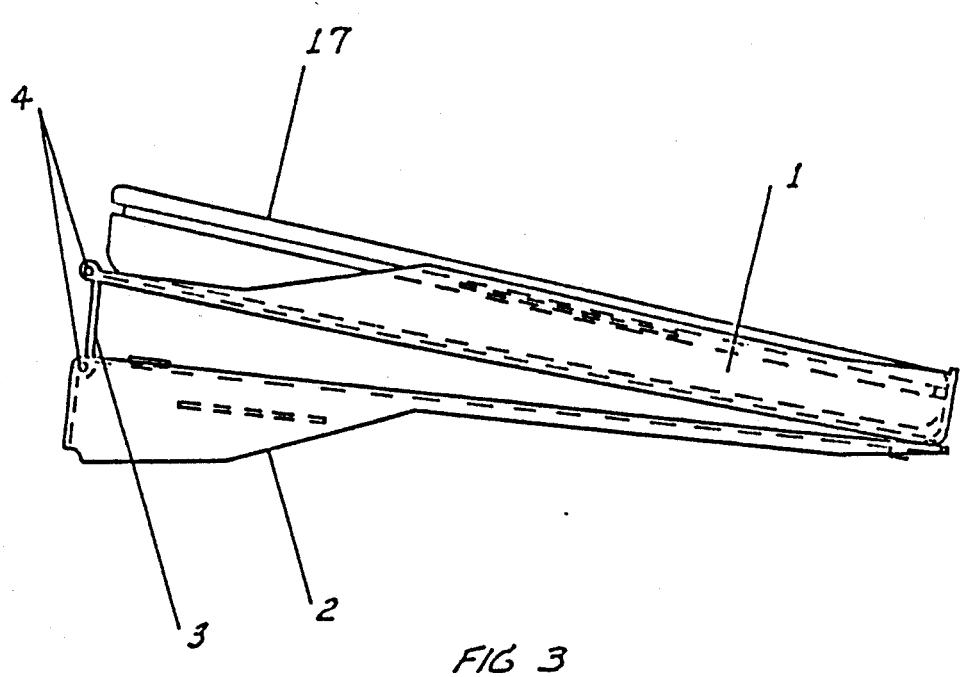
FIG. 3 shows the case-stand in a side view in the fully open stand position. With the instrument being held by the stand.

The user can slide the instrument 17 into the case bottom 1, FIG. 3 allowing the insert holding feature 11, of case bottom 1, FIG. 11 to hold the instrument 17, securely in the case bottom 1, whereby not allowing the instrument 17, to fall out of the open case.

Figure 8:
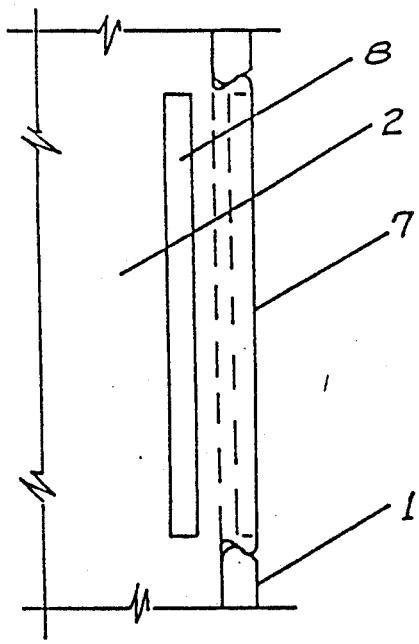
FIG. 8 shows a top view of latch of such case-stand taken along the line 8—8 FIG. 6.
Figure 6:
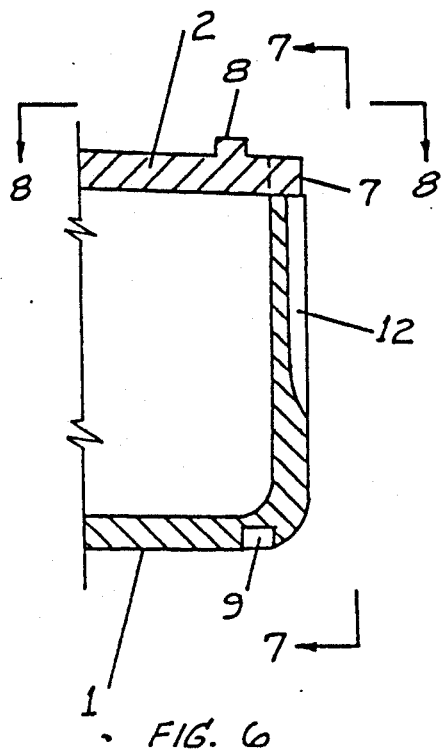
FIG. 6 shows a sectional view of the latch recess of such case-stand taken along the line 6—6 FIG. 4.
Figure 7:
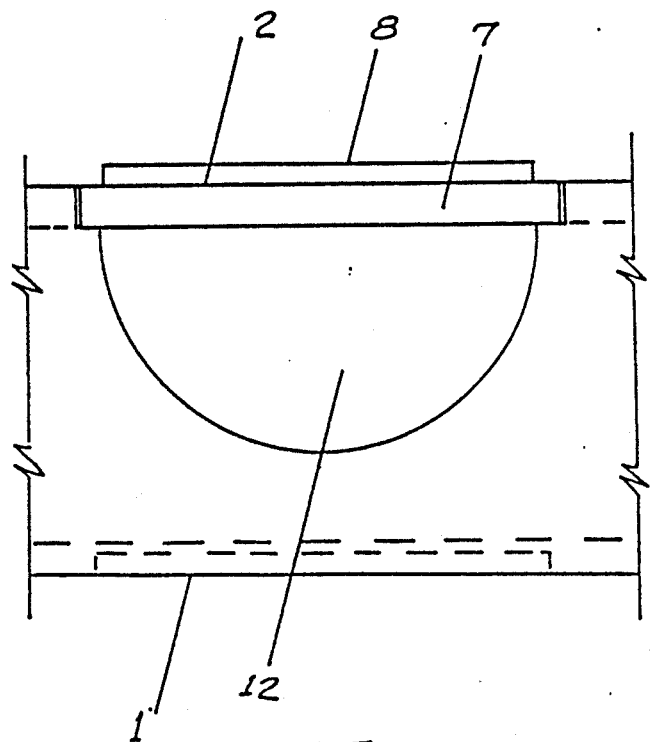
FIG. 7 shows a front view of the latch recess of such case-stand taken along the line 7—7 FIG. 6.
Figure 10:
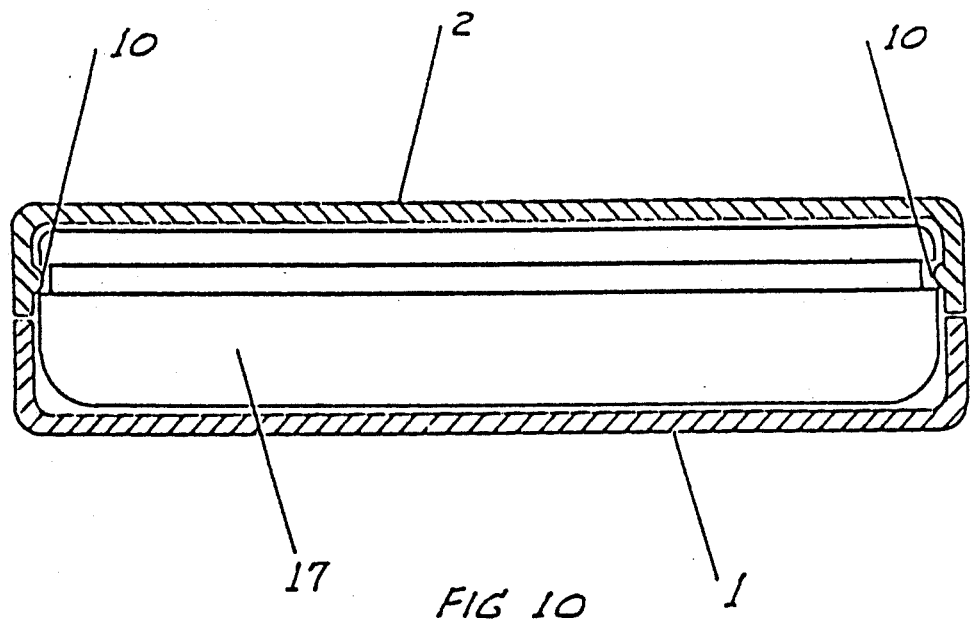
FIG. 10 shows a sectional view of the insert holding feature of case top taken along the line 10—10 FIG. 4. (Rotated 90° clockwise).

Once the user has placed the instrument 17 into the case bottom 1, FIG. 3, the case can be closed by pressing downward on the case top 2, causing the latch 7 feature of case top 2, to latch with the case bottom 1, FIG. 6, FIG. 7 and FIG. 8. The insert holding feature 10, of the case top 2, helps hold the top case 2, to the instrument 17, on the inside of case top 2, (both sides) when in the fully closed position, FIG. 10.

When the user wants to use the instrument 17, the user can open the case by pressing upward at the latch recess feature 12, by placing a finger or thumb in the latch recess feature 12, in the case bottom 1, FIG. 7. The case bottom 1 and the case top 2, will unlatch when enough pressure has been applied upward. The user can then swing the case top 2, approximately 360 degrees underneath the case bottom 1, thereby converting the hard, durable protective carrying case into a very sturdy desk stand, FIG. 3. The case bottom 1 and case top 2, lock together by placing the insert locking feature 8, of the case top 2, into the cavity locking feature 9, of the case bottom 1, FIG. 9. The case top 2, has a soft rubber non-skid foot 16, which holds the desk stand from sliding on a smooth desk or table surface.

If the user wants to remove the instrument 17, he can slide the instrument by lifting the instrument slightly upward to clear the hinge then pull the instrument 17, out of the insert holding feature 11 (both sides) of the case bottom 1, towards the open end (hinge end) of the case bottom 1 when in the fully open stand position of the case-stand, FIG. 11.

While I have described the process of opening, closing and removing or placing instrument in case-stand of the invention in some detail, in practice I have found that it can be converted from a case to a desk stand very rapidly and neatly, usually in less than ten seconds. I have made a cardboard model allowing me to actually see how the case-stand operates.

CONCLUSION AND SCOPE OF INVENTION

While the above description of Invention and Operation of invention contains many specificities, the reader should not construe these as limitations on the scope of the invention but merely as exemplification of preferred embodiments, thereof. Those skilled in the art will envision many other possible variations are within its scope. For example, skilled artisans will readily be able to change the dimensions and shapes of the various embodiments. They will also be able to make the case-stand of alternative materials, such as different plastics, metals, leather, rubber and wood. They can make many variations of the latching 7, feature, FIG. 8, of the latch recess 12 feature, FIG. 6, of the interlocking 8 and 9 feature, FIG. 9, and of the insert holding feature 10 and 11, FIG. 10 and FIG. 11, of the soft rubber non-skid foot 16, FIG. 9, of the hinge 3, FIG. 5; for example, make it hinge at the bottom edge of the case-stand instead of at the top edge of the case-stand, FIG. 4. All the above mentioned variations could be round, square, angled, sloped, reversed (opposite in nature). As an alternative, the height, width, length, thickness of walls on sides, top and bottom of case-stand, surface texture all these mentioned variations could be incorporated into my invention; therefore, making these variations not novel or unobvious for those skilled in the art, should they in the future envision these possible variations in a future design of a case-stand for hand-held calculators, or hand-held computers, or hand-held data collectors. Accordingly, the reader is requested to determine the scope of the invention by the appended claims and their legal equivalents, and not by the examples which have been given.

I claim:

1. A combination case-stand for holding hand-held instruments, such as calculators, computers or data collectors, comprising:

a rectangular case bottom, a rectangular case top and a hinge member made of hard, durable material of sufficient size to accommodate and encase such instruments, the case bottom and the case top each having a first end and a second end, a first set of hinge pins journalled in aligned hinge knuckles on a first end of the case bottom and a first edge of the hinge member for attaching the case bottom to the hinge member, and a second set of hinge pins journalled in aligned hinge knuckles on the first end of the case top and a second edge of the hinge member for attaching the case top to the hinge member, whereby the case top can be pivoted about the second set of hinge pins from the case bottom and then shifted over the first end of the case bottom in a direction to rotate the hinge member approximately one hundred and eighty degrees about the first set of hinge pins allowing the case top to be pivoted further about the second set of hinge pins to a position underneath the case bottom to form a support stand for the latter.

2. A combination case-stand according to claim 1, in which:

the second end of the case top has a latch element engageable with a keeper on the second end of the case bottom, whereby downward on the case top causes the case top and the case bottom to latch together securely in the fully closed position to encase the instrument.

3. A combination case-stand according to claim 2, in which:

the second end of the case bottom has a recess to allow a user to apply upward pressure on the latch element to cause the latter to unlatch and open the case.

4. A combination case-stand according to claim 1, in which:

the case bottom has side walls provided with instrument holding means for holding the instrument securely while in use in a fully open stand position.

5. A combination case-stand according to claim 1, in which:

the case top has side walls provided with instrument holding means to help hold the case top against the instrument in the fully closed position.

6. A combination case-stand according to claim 1, in which:

a soft rubber non-skid surface material is on an outer surface of the case top, the non-skid material is effective when the case-stand is in the fully open stand position to restrain the case-stand against sliding movement when placed on a smooth desk surface when being used.

7. A combination case-stand according to claim 1, in which:

an insert locking means on the second end of the case top that can be inserted into a cavity locking means in the second end of the case bottom to hold the case bottom and the case top together in the fully open stand position.

8. A combination case-stand according to claim 1, in which:

in the fully closed position as in the fully open stand position the same area of space is taken up on the desk surface by the case stand.

* * * * *